United States Patent [19]

Kishida

[11] Patent Number: 5,062,748
[45] Date of Patent: Nov. 5, 1991

[54] SHANK STRUCTURE FOR ANNULAR HOLE CUTTER

[75] Inventor: Shigeru Kishida, Miki, Japan

[73] Assignee: ODSK Company, Limited, Hyogo, Japan

[21] Appl. No.: 684,786

[22] Filed: Apr. 15, 1991

[51] Int. Cl.$^5$ .............................................. B23B 51/04
[52] U.S. Cl. ..................................... 408/206; 408/209
[58] Field of Search ................. 408/68, 204, 206, 207, 408/209, 703

[56] References Cited

U.S. PATENT DOCUMENTS 3,609,056 9/1971 Hougen.
4,408,935 10/1983 Miyanaga.
4,555,203 11/1985 Takahashi .......................... 408/209

FOREIGN PATENT DOCUMENTS 201114 12/1982 Japan ................................. 408/209
10416 1/1983 Japan ................................. 408/209

Primary Examiner—Daniel W. Howell
Attorney, Agent, or Firm—Morris Fidelman; Franklin D. Wolffe

[57] ABSTRACT

A shank structure for holding an annular hole cutter used for drilling a large circular hole, comprising a hollow cylindrical body, a center drill inserted in the inner cavity of the body and clutch means for inhibiting and allowing relative motion between the body and the center drill. In normal or initial state, the body and the center drill are inhibited from their relative motion by the clutch means and, in drilling operation, a central guide hole is first drilled by the center drill. When the guide hole reaches a suitable depth, the clutch means is actuated to allow the relative motion between the body and the center drill and the center drill stops drilling and sinks into the inner cavity of the body. Then, the annular hole cutter secured to the body starts to drill a main hole and, upon completion of the main hole, the center drill is pushed out from the inner cavity by spring action and, at the same time, discharges a disc-shaped chip formed within the annular hole cutter. Accordingly, it gives such an advantage in that centering by the guide hole and discharge of the chip are effected automatically at the same time.

4 Claims, 2 Drawing Sheets

SHANK STRUCTURE FOR ANNULAR HOLE CUTTER

BACKGROUND OF THE INVENTION

This invention relates to a shank structure or holder for holding an annular hole cutter. This structure is especially effective in case of using a simple drilling machine, such as a portable drilling machine, which cannot fix a relative position of a cutter and an object to be worked.

As disclosed in U.S. Pat. No. 3,609,056, for example, the annular hole cutter means a tool including a cylindrical cup-shaped body having saw-tooth-like cutting edges on its open end and a coaxial shank fixed to its closed end for cutting an annular groove and finally forming a large circular hole by pressing the cutting edges against the object and rotating the shank. In this case, there will be no trouble when a relative position of the cutter and the object is certainly fixed as in the case of large stationary drilling machine. However, it is very difficult to maintain the center of drilled hole when it is impossible to fix the relative position of the cutter and the object as in the case of portable drilling machine. In such case, therefore, it is a general practice, as shown in the above U.S. patent, to fix a drill coaxially with the shank of the annular cutter with its top a little projecting from the cutting edges of the cutter and to form a center hole first by the drill and then cut a large hole by the cutter using the center hole as a guide.

When a hole is formed by such annular hole cutter, a disc-like chip is naturally left within the "cup" of the cutter and it is a very troublesome and time-consuming work to remove this chip.

The annular hole cutter disclosed in U.S. Pat. No. 4,408,935 is adapted to automatically remove such chip. The shank structure of this cutter has a coaxial cylindrical cavity therein in which a coiled spring and a center pin are inserted. The center pin is constantly urged outwords by the spring and adapted to rotate with the cutter. While the initial appearance of this structure is similar to the cutter structure of the above U.S. Pat. No. 3,609,056, if the cutter is pressed against the object, the center pin is pushed into the cavity against the spring without drilling a hole and, when the drilling operation is finished, it is returned to the initial position by the spring to push out the chip left in the "cup". In this structure, however, it is very difficult to obtain the abovementioned "self-centering effect" since it cannot form a guide hole in the center.

SUMMARY OF THE INVENTION

Accordingly, an object of this invention is to provide a novel and improved shank structure for annular hole cutter, which can not only drill a guide hole in the center to obtain sufficient self-centering effect, but also automatically remove a drill chip upon completion of drilling.

The above object can be attained in accordance with this invention which provides a shank structure for annular hole cutter, which comprises a shank body having a coaxial cylindrical inner cavity and a head end adapted to fix an annular hole cutter, a spring inserted in the inner cavity, a center drill inserted in the inner cavity and constantly urged outwards by the spring, a sleeve slidably fit on the center drill, first clutch means responsive to axial movement of the sleeve for inhibiting and allowing axial movement of the center drill, and second clutch means responsive to the axial movement of the center drill for inhibiting and allowing rotation of the center drill. In the initial or normal state, the center drill is inhibited from its axial movement and rotation by the above clutch means and, when the chank structure attached with an annular hole cutter is pressed against an object to be worked, the center drill begins to drill a center hole at first. After drilling by a predetermined depth, the above sleeve butts against the object and releases the first clutch means. Therefore, the center drill is pushed into the cavity against the spring and releases the second clutch means. Thus, the center drill interrupts rotation and, then, the annular hole cutter begins to drill a main hole.

According to the structure of this invention, a sufficient guide hole is formed before the main hole is drilled. Therefore, it is possible to obtain the desired self-centering effect, but also push out the chip by the center drill which is returned to the initial position by the spring after drilling the main hole, as the guide pin in the shank structure of the above U.S. Pat. No. 4,408,935.

These and other features and operation will be described in more detail below about an embodiment thereof with reference to the accompanying drawings.

BRIEF DESCRIPTION OF THE DRAWINGS

In the drawings.

Throughout the drawings, same reference numerals are given to the same structural components.

DESCRIPTION OF PREFERRED EMBODIMENT

Figure 1:
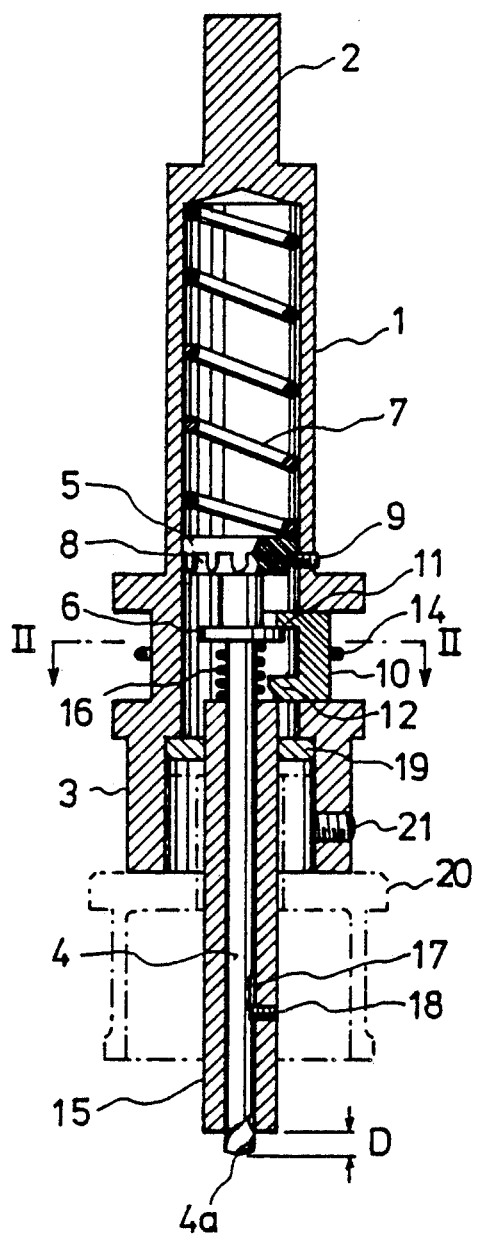
FIG. 1 is a sectional side view showing an embodiment of the shank structure according to this invention.

A shank structure shown in FIG. 1 includes a hollow cylindrical body 1 which has a shank 2 to be held by a chuck of a drilling machine (not shown) at an end thereof and a cup shaped cutter holding portion 3 for holding an annular hole cutter at the other end, and a center drill 4 inserted in the inner cavity of the body 1. The center drill 4 has a drill edge 4a formed at the top and rotational and axial clutch discs 5 and 6 fixed at the rear end. A coiled spring 7 is inserted between the clutch disc 5 and the bottom of the cavity and the center drill 4 is constantly urged outwards by the spring 7.

Figure 2:
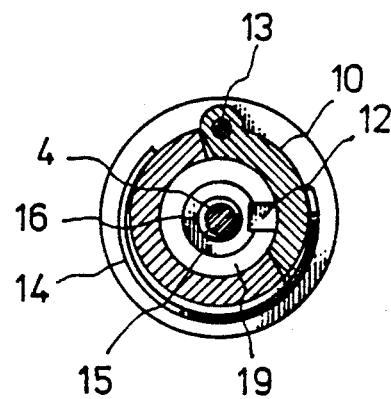
FIG. 2 is a cross-sectional view of the structure of FIG. 1 along line II—II thereof.

The clutch disc 5 which slidably fit in the cavity has a plurality of depressions 8 formed in its peripheral wall and adapted so that one of the depressions 8 engages with a stop pin 9 screwed in the side wall of the body 1 to inhibit the center drill from rotation and axial outward movement. A portion 10 of the side wall of the body 1 having two inward projections 11 and 12 is hinged by a pivot 13 so that it can be opened and closed as a door as shown in FIG. 2. This portion 10 is constantly urged to be closed by a C-shaped spring 14 and, in the initial state of FIG. 1, the upper projection 11 engages with the second clutch disc 6 to inhibit the center drill 4 from its inward movement. The bottom face of the lower projection 12 constitutes a cam surface.

A thick sleeve 15 is slidably fit on the center drill 4 and constantly urged axially outwards by a second coiled spring inserted between its rear end and the clutch disc 6. A depression 17 is formed in part of the center drill 4 for engaging with a stop pin 18 screwed in the sleeve wall to inhibit the center drill 4 from its outward movement. In the initial state, as shown in FIG. 1, the fore end of the center drill 4 extends beyond the fore end of the sleeve 15 by a predetermined length D and the rear end of the sleeve 15 is just released from the cam surface of the projection 12. The sleeve 15 is supported by a bearing plate 19 fixed to the body 1 so that it can slide axially within the length of the depression 17 and also rotate with the center drill 4.

The cup-shaped cutter holding portion 3 at the top of the body 1 is adapted to fixedly hold an annular hole cutter 20 inserted therein as shown in phantom in FIG. 1 by a tightening screw 21.

Now, the description will be made in detail below about an operation of the above-described shank structure.

Figure 4:
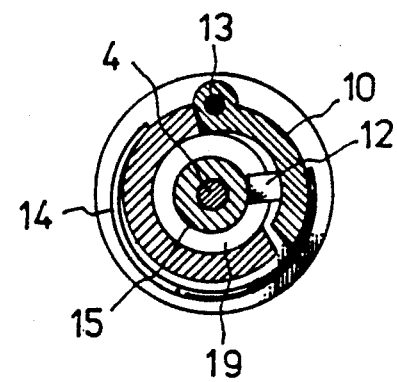
FIG. 4 is a cross-sectional view of the structure of FIG. 3 along line IV—IV thereof.
Figure 3:
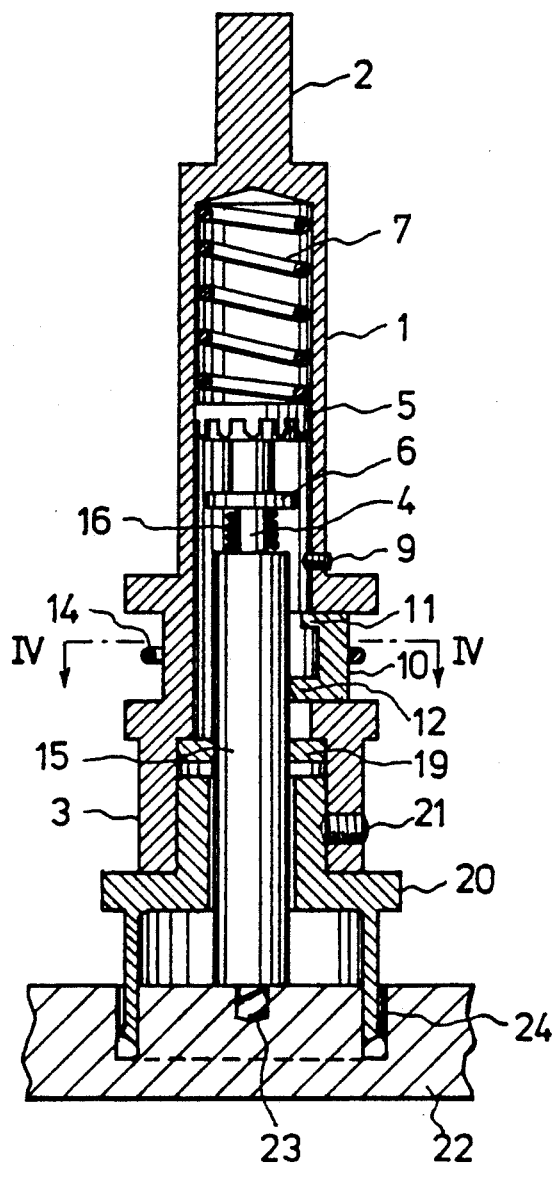
FIG. 3 is a sectional side view showing the structure of FIG. 1, which is attached with an annular hole cutter and is in the middle of drilling operation.
Figure 5:
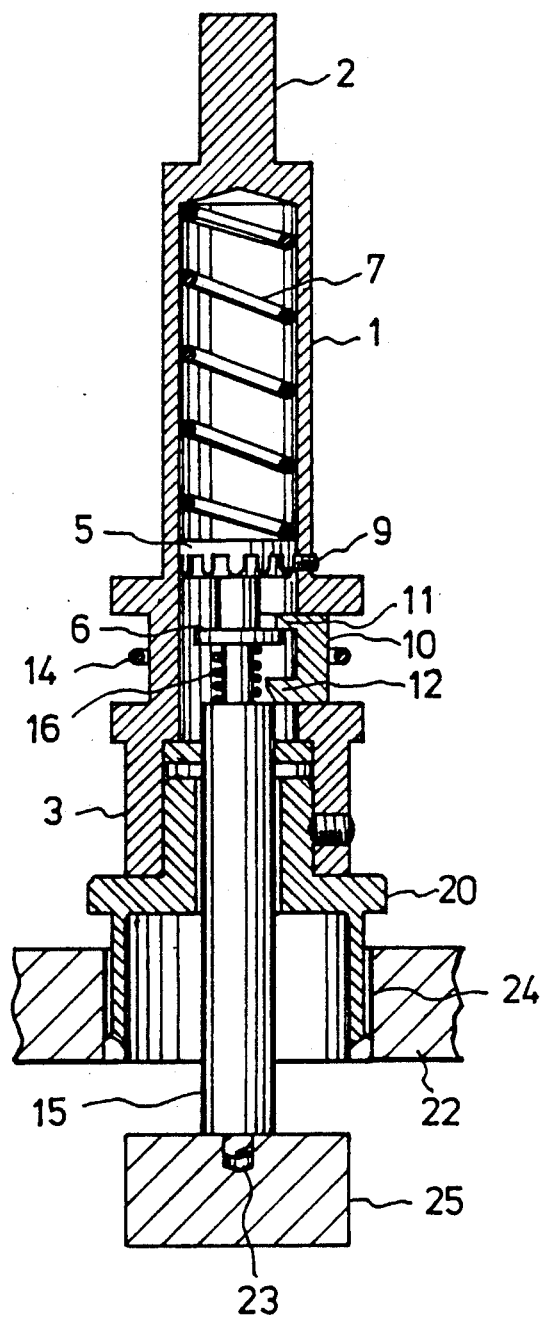
FIG. 5 is a sectional side view of the structure of FIG. 3 showing a state upon completion of drilling.

When the shank structure of this invention having the annular hole cutter 20 fixed thereto as shown in phantom in FIG. 1 is secured to an arbitrary drilling machine (not shown) and driven rotationally, the center drill 4 rotates with the body 1 since it is fixed to the body 1 in both rotational and axial directions through the clutch discs 5 and 6, stop pin 9 and projection 11 in the initial state as shown. If it is pressed against a plate material 22 (FIG. 3) to be drilled, a drilling operation of a center hole 23 (FIG. 3) is initiated first by the center drill 4. When the center hole reaches the depth D, the sleeve 15 is pushed upward by the surface of the material 22 against the spring 16 and the cam projection 12 is pushed radially outwards by the upper end of the sleeve 15. Accordingly, the door portion 10 is opened as shown in FIG. 4 against the spring 14 to release the stop projection 11 from the disc 6. Thus, the center drill 4 becomes free in the axial direction and is pushed upwards against the spring 7 as rotating with the sleeve 15. As a result, the clutch disc 5 is released from the stop pin 9 and the center drill 4 becomes free to rotate with respect to the body 1. Accordingly, the center drill 4 stops its rotation to finish drilling of the center hole 23 and is further raised. Then, the annular hole cutter 20 butts against the material 22 to initiate drilling of a main hole 24 (FIG. 3.) As the center drill 4 is raised further against the spring 7, the main hole 24 is continuously drilled as shown in FIG. 3. When the annular hole cutter 20 finally penetrates the material 22 to complete the main hole 24, as shown in FIG. 5, the center drill 4 and the sleeve 15 are pushed downwards by the springs 7 and 16 to the same position as in FIG. 1, where the clutch disc 5 engages with the stop pin 9 and the door portion 10 is closed to engage the projection 11 with the clutch disc 6. At the same time, the center drill 4 and the sleeve 14 push out a disc shaped chip 25 formed within the annular hole cutter 20 to discharge therefrom as shown. The chip 25 falls automatically or can be removed simply.

As described above, with the shank structure of this invention, the center hole 23 of a depth a little deeper than D of FIG. 1 is formed before drilling of the main hole 24 and the main hole 24 is drilled using the center hole 23 as a guide. Accordingly, the self-centering effect is automatically and certainly obtained and removal of the chip 25 is also effected automatically and simply.

The above embodiment has been presented for illustrative purpose only and does not intend any limitation of the invention. It should be evident for those skilled in the art that this invention can be modified in various fashion within the spirit and scope of this invention as defined in the appended claims.

I claim:

1. A shank structure for annular hole cutter comprising a hollow-cylindrical body having a holder portion for holding an annular hole cutter at an end thereof, a center drill slidably inserted in an inner cavity of said body, and a spring disposed in said cavity for urging said center drill axially outwards, characterized by A sleeve fit on said center drill and adapted to be axially slidable, first clutch means responsive to the axial movement of said sleeve for inhibiting and allowing the axial movement of said center drill, second clutch means responsive to the axial movement of said center drill for inhibiting and allowing rotation of said center drill, wherein both axial movement and rotation of said center drill is inhibited by said first and second clutch means in the initial state and, when said body is rotated, said center drill first drills a center hole and, after drilling the center hole of a predetermined depth, said sleeve moves axially to release said first clutch means, thereby moving said center drill axially to release said second clutch means to stop rotation of said center drill.

2. A shank structure for annular hole cutter as set forth in claim 1, characterized in that said first clutch means includes a first disc coaxially fixed to said center drill, and a first stopper member responsive to the axial movement of said sleeve for projecting into said cavity to engage with said first disc, and said second clutch means includes a second disc coaxially fixed to said center drill and having a plurality of depressions in the peripheral wall, and a second stopper member fixed to said body and projecting into said cavity to engage with said depressions.

3. A shank structure for annular hole cutter as set forth in claim 2, characterized in that said first stopper member is fixed to cam means responsive to the axial movement of said sleeve to move radially and adapted to move therewith for releasing engagement with said first disc.

4. A shank structure for annular hole cutter as set forth in claim 3, characterized in that said cam means includes a door-shaped member which forms part of the side wall of said body and is opened and closed about an axis parallel to said center drill.

* * * * *

UNITED STATES PATENT AND TRADEMARK OFFICE
CERTIFICATE OF CORRECTION

PATENT NO. : 5,062,748

DATED : November 5, 1991

INVENTOR(S) : Shigeru Kishida

It is certified that error appears in the above-identified patent and that said Letters Patent is hereby corrected as shown below:

On Title Page, item
    [30]   Foreign Application Priority Data

November 20, 1990 [JP]    Japan .......... H2-316572

Signed and Sealed this

Ninth Day of March, 1993

*Attest:*

STEPHEN G. KUNIN

*Attesting Officer*      *Acting Commissioner of Patents and Trademarks*